United States Patent [19]

Petteruti et al.

[11] Patent Number: 5,335,170
[45] Date of Patent: Aug. 2, 1994

[54] MODULAR SYSTEM FOR INVENTORY CONTROL

[75] Inventors: Alfred J. Petteruti; Steven F. Petteruti, both of East Greenwich; Robert J. Bouthillier, Lincon; Robert A. Petteruti, East Greenwich, all of R.I.

[73] Assignee: Comtec Information Systems, Inc., Warwick, R.I.

[21] Appl. No.: 940,428

[22] Filed: Sep. 4, 1992

[51] Int. Cl.5 .................... G06F 15/00; G06K 7/10
[52] U.S. Cl. .................................... 364/403; 235/472
[58] Field of Search ............ 364/407, 403; 235/472, 235/432

[56] References Cited

U.S. PATENT DOCUMENTS

| | | | |
|---|---|---|---|
| 4,210,802 | 7/1980 | Sakai | 235/483 |
| 4,251,798 | 2/1981 | Swartz et al. | 340/146.3 SY |
| 4,387,297 | 6/1983 | Swartz et al. | 235/462 |
| 4,409,470 | 10/1983 | Shepard et al. | 235/472 |
| 4,673,805 | 6/1987 | Shepard et al. | 235/472 |
| 4,727,245 | 2/1988 | Dobbins et al. | 235/472 |
| 4,758,717 | 7/1988 | Shepard et al. | 235/472 |
| 4,845,350 | 4/1991 | Shepard et al. | 235/472 |
| 4,983,818 | 1/1991 | Knowles | 235/472 |
| 5,047,615 | 9/1991 | Fukumoto et al. | 275/432 |
| 5,059,778 | 10/1991 | Zouznlas et al. | 235/472 |
| 5,107,100 | 4/1992 | Shepard et al. | 235/472 |
| 5,130,520 | 7/1992 | Shepard et al. | 235/472 |
| 5,218,187 | 6/1993 | Koenck et al. | 235/375 |
| 5,226,540 | 7/1993 | Bradbury | 206/576 |

*Primary Examiner*—Roy N. Envall, Jr.
*Assistant Examiner*—X. M. Chung-Trans
*Attorney, Agent, or Firm*—Testa, Hurwitz & Thibeault

[57] ABSTRACT

A modular and portable system adapted to provide inventory control functions comprises a programmable master module including a display, a keypad, and processing electronics, and a scanning module for reading bar code symbols, where the master module is interconnectable with the scanning module to form a portable scanner for reading and analyzing bar code symbols, and the master module is adapted to interconnect to a plurality of other modules such as a printer module, an interface module, and a suitcase module.

7 Claims, 6 Drawing Sheets

MODULAR SYSTEM FOR INVENTORY CONTROL

FIELD OF THE INVENTION

This invention relates to a portable inventory control system, and more particularly, to a modular, portable inventory control system including a programmable master module which is interconnectable with a plurality of peripheral modules such as a scanning module and a printer module.

BACKGROUND OF THE INVENTION

Stationary check-out counter scanners are widely used in department and grocery stores to read bar code symbols on products. A bar code symbol typically includes a series of lines and spaces of varying widths which uniquely identifies the product on which the bar code symbol is printed. The stationary scanners typically read and decode the bar code symbols for check-out and inventory purposes.

Portable scanning systems have been developed which eliminate the need to bring products to the scanner. Instead, the portable scanner may be brought to the location of the products. Some portable scanning systems provide a wide variety of inventory control functions such as product tracking, merchandise ordering, label/tag printing, product pricing, and price verification. Such portable scanning systems have been used in many industries such as the grocery and food products industry.

SUMMARY OF THE INVENTION

In general, in one aspect, the invention features a modular and portable system adapted to provide inventory control functions and comprising a programmable master module including a display, a keypad, and processing electronics, and a scanning module for reading bar code symbols, wherein the master module is interconnectable with the scanning module to form a portable scanner for reading and analyzing bar code symbols, and the master module is adapted to interconnect to a plurality of other modules.

The plurality of other modules may include a printer module, an interface module, and a suitcase module. The programmable master module further may include a radio-frequency antenna and radio-frequency communication electronics. The scanning module may comprise a laser scanner or a charge-coupled device scanner.

The modular, portable system provides an easy-to-use, versatile system capable of a wide variety of inventory control functions.

The system can be reconfigured easily by a user to address the user's particular needs. A module failure can be handled quickly and easily by swapping the failed module with a new module. The modularity of the system permits a user to acquire only those modules he or she needs while providing the user the flexibility to expand the capabilities of his or her system in the future by adding new modules as they become available or as they become needed.

Other aspects, features, and advantages of the invention will become apparent from the following description and from the claims.

DETAILED DESCRIPTION

Figure 1:
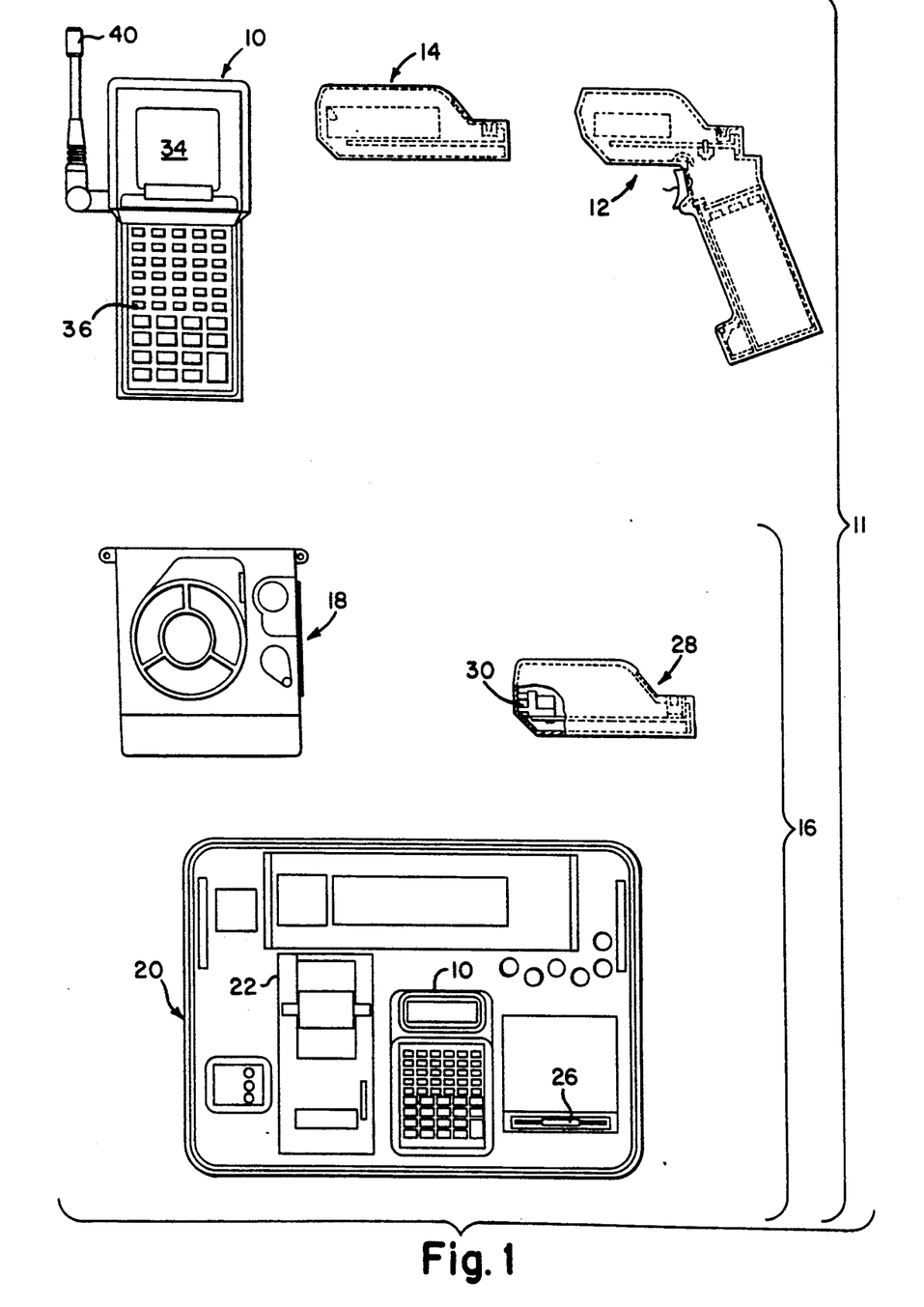
FIG. 1 provides schematic views of some modules of a modular system for inventory control according to the invention.
Figure 2A:
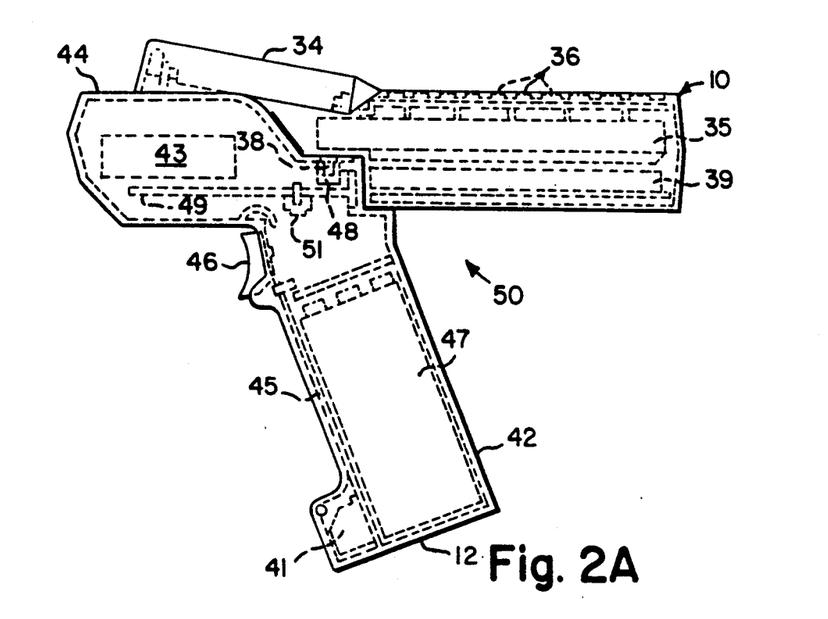
FIGS. 2A-2E are schematic views of a master module interconnected to various other modules of the modular system for inventory control according to the invention.

Referring to FIGS. 1 and 2A, in one embodiment of the invention, a modular system 11 comprises a programmable master module 10 which is interconnectable with a scanning module, such as a laser scanning module 12 or a charge-coupled device (CCD) scanning module 14, and a variety of other modules 16. The other modules 16 may include a printer module 18, a suitcase module 20 which may include one or more printers 22 and a storage device 26 (e.g., a disk drive), and an interface module 28 having one or more interface connectors 30 (e.g., an RJ-41 connector, a circular DIN connector) for interfacing with the master module 10 in one or more input/output (I/O) formats. The master module 10 can have a display 34, a keypad 36, programmable processing electronics 35 (described below), and an interconnector 38 for interfacing with the various modules 12, 14, 16. A radio-frequency (RF) antenna 40 and associated RF electronics 39 (described below) may be provided to allow wireless, real-time RF communication with, for example, one or more remote databases.

When interconnected with the scanning module, the master module 10 generally obtains inventory information from the scanning module such as undecoded (or possibly decoded) bar code symbol data. The scanning module also may be connected to a cable via its RJ-41 port 41 and thus the master module also may receive inventory information from a device connected to the port 41. This information typically is compared with information stored in the master module 10, and may be used to print labels, for example, via a printing device which may be connected to the master module 10 and/or to the port 41.

In the disclosed embodiment, the master module 10 contains 4 megabytes of storage and generally is as powerful as a personal computer such as an Apple Macintosh. Typically, the master module 10 is a relatively expensive module of the modular system 11 and, consequently, the modular system 11 typically includes one master module 10 which is interconnectable with a variety of other (generally less expensive) modules such as the modules 12, 14, and 16. Typically, the master module 10 is factory-programmed to perform the particular inventory control functions desired by a particular user of the modular system 11.

As shown in FIG. 2A, the laser scanning module 12 may include a generally gun-shaped housing having a handle portion 42 and a head portion 44. The handle portion 42 may include a trigger 46, and the head portion 44 may include a laser scanner 43 for projecting laser light and receiving reflected laser light under control of the trigger 46. The head portion 44 also includes an interconnector 48 which mates with the interconnector 38 of the master module. When mated together via the interconnectors 38 and 48, the laser scanning module 12 and the master module 10 form a light-weight, stand-alone, portable, hand-held, programmable, microprocessor-controlled laser scanning device 50 capable of, for example, reading and analyzing bar code symbols.

Typically, to read a bar code symbol, a user places the device 50 about 10 inches from the bar code symbol and pulls the trigger. The device 50 also can be factory-configured to read from 60 inches away (or further) from a bar code symbol. Other means to initiate the reading of a bar code symbol are known, including automatically reading when the presence of an object is sensed (commonly referred to as automatic object-sense).

In the disclosed embodiment, the laser scanning module 12 also has an RJ-41 communication port 41, a corresponding communication adapter board 45, and a battery pack 47 located in the handle portion 42. An interconnect board 49 supports the interconnector 48 and generally maintains the interconnector 48 in alignment for mating with the interconnector 38 of the master module 10. The interconnect board 49 also connects to a trigger switch 51 and the laser scanner 43. The trigger switch 51 activates the laser scanner 43 when the trigger 46 is pulled.

Figure 2B:
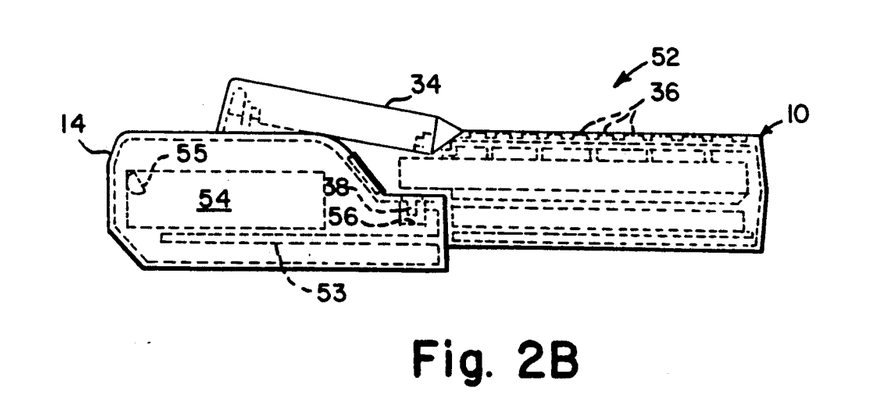

Referring to FIG. 2B, the master module 10 can be mated with the CCD scanning module 14 to form a light-weight, stand-alone, portable, hand-held, programmable, microprocessor-controlled CCD scanning device 52 capable of, for example, reading and analyzing bar code symbols. Unlike the laser scanning device 50 of FIG. 2A, the CCD scanning device 52 typically must be held in contact with a bar code symbol to read the bar code symbol. In the disclosed embodiment, the CCD scanning module 14 has an interconnector 56 for mating with the interconnector 38 of the master module 10. The CCD scanning module has a CCD scanner 54 with an LED light array 55, and an adapter board 53 which connects the CCD scanner 54 to the interconnector 56 and which generally maintains the interconnector 56 in alignment for mating with the interconnector 38 of the master module 10.

The CCD scanning module alternatively may be housed in a gun-shaped housing, as is the laser scanning module of the disclosed embodiment.

Note that either the laser scanning module 12 or the CCD scanning module 14 generally can be used as a stand-alone scanner without the master module 10 connected to it. When used as a stand-alone scanner, the laser scanning module 12 or the CCD scanning module 14 would produce "raw" high and low data sequences representative of a bar code symbol but would not be capable of interpreting (i.e., decoding) the sequences (unless the scanner contains an optional microcontroller for performing decode algorithms).

Figure 2C:
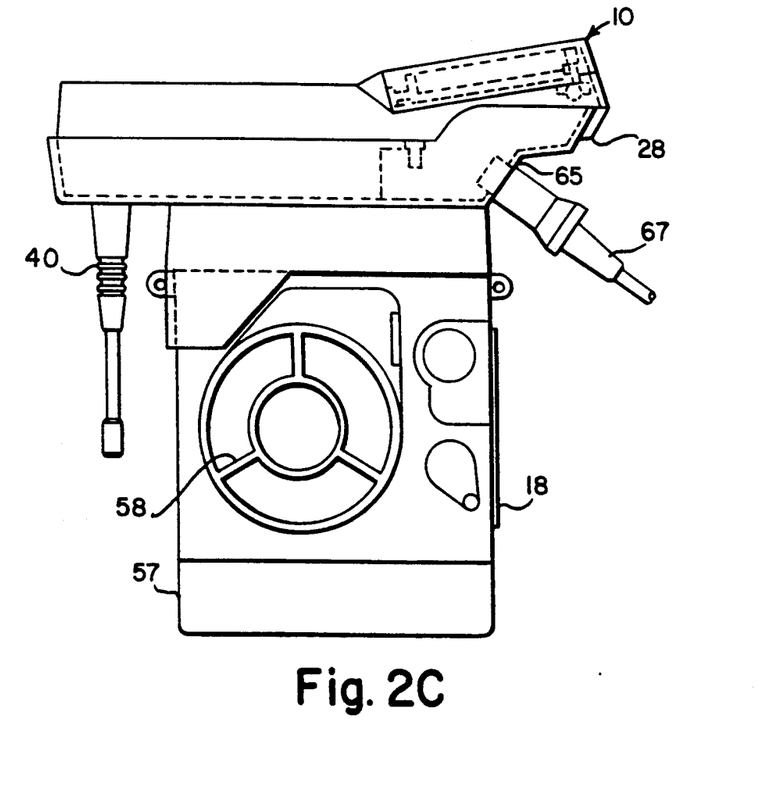

The printer module 18 may include a variety of printing devices. In the disclosed embodiment, as shown in FIG. 2C, the printer module 18 has one printing device which utilizes direct thermal printing to print, for example, product labels, price tags, and inventory reports. Other methods of printing are possible and known to those of ordinary skill in the art. The printer module 18 may have a battery pack 57 and a paper supply spool 58.

While the master module 10 may be connected to the printer module 18 by mating the interconnector 38 on the master module 10 directly to the printer module 18, the disclosed embodiment utilizes the interface module 28 (sometimes referred to as a cradle adapter) to electrically and physically connect the master module 10 to the printer module 18. A first side of the interface module 28 of FIG. 2C may have an interconnector 66 which mates with the interconnector 38 of the master module 10, and a second side of the interface module 28 may mate with the printer module 18.

In other embodiments, the second side of the interface module 28 can be configured to accommodate a variety of other modules such that the master module 10 can be connected to and operated with any of the variety of other modules.

The interface module 28 can include a port 65 for receiving a cable 67 from a scanner, which might be the scanning module 12 without the master module connected as in FIG. 2A or the CCD scanning module 14 without the master module connected as in FIG. 2B, or a known scanning device.

Typically, the master module 10 is interconnected to the printer module 18 to print bar code identifying labels, product identifying labels, or price tags, for example.

Figure 2D:
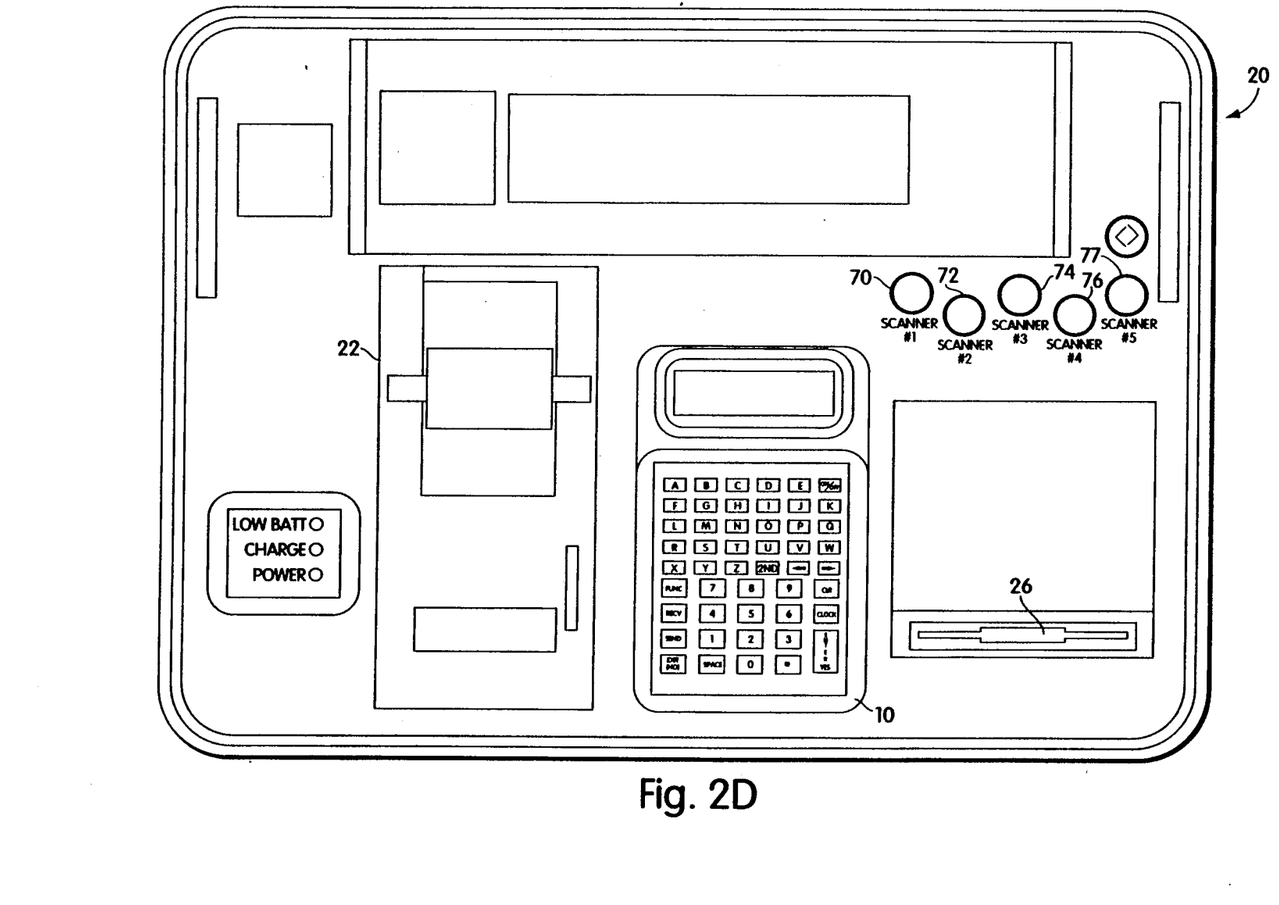

Referring to FIG. 2D, the suitcase module 20 includes an interconnector 68 (not shown but similar to the interconnectors of modules 12, 14, 18, and 28) for mating with the interconnector 38 of the master module 10. The printer 22 can be similar to those described above (e.g., a thermal printing device). The storage device 26 may comprise a disk drive (either hard or floppy, or a solid-state cartridge, for example) or any other type of storage device known to one of ordinary skill in the art, and can be used to input data into or remove data from the master module 10. In addition to the interconnector 68, the suitcase module 20 also might include an Institute of Electrical and Electronic Engineers (IEEE) RS232 port 70, an RS485 port 72, a decoded scanner port 74, and an undecoded scanner port 76 (as well as another port 77 which can accommodate a variety of other data formats).

The suitcase module 20 can be equipped with a high-capacity rechargeable power source (not shown) to allow for relatively long periods of uninterrupted operation.

The RS232 port 70 may be used to connect to a host computer, point-of-sale terminal equipment, or an external modem (or similar serial communication devices). The RS485 port 72, a multi-drop serial communication line interface, can be used to connect to point-of-sale equipment or other compatible equipment. The decoded scanner port 74 may be used to connect scanners (e.g., laser scanners, CCD scanners, or pen-type bar-code wands) having on-board, barcode-interpreting electronics (which typically are microprocessor-based). The undecoded scanner port 76 may be used to connect scanners which do not have the capability to interpret barcodes (e.g., scanners without on-board, barcode-interpreting electronics) but which simply transmit "raw" high and low data sequences representing the lines and spaces of a bar code symbol to the master module 10. The master module 10 typically interprets (i.e., decodes) such raw data sequences.

Conventional scanners such as known laser scanners, known CCD scanners, and known pen scanners typically are used with both the decoded scanner port 74 and the undecoded scanner port 76.

The suitcase module 20 may be provided in a rugged case 78 for portability and long life in demanding environments. Also, the suitcase module 20 can be mounted on a mobile cart (not shown) to aid in moving the module 20.

Figure 2E:
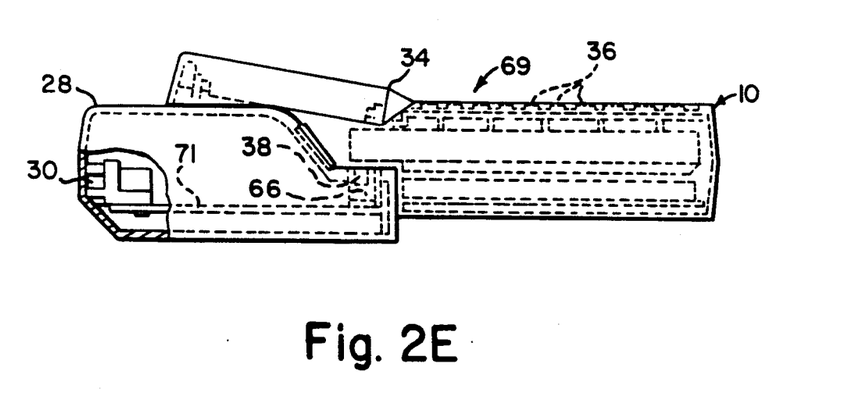

The interface module 28, as depicted in FIG. 2E, can provide I/O to and from the master module 10 in a variety of formats, e.g., via the connector 30. The interconnector 38 of the master module 10 mates with the interconnector 66 on the interface module 28 to form an integral unit 69 which allows a variety of modules/devices to be interfaced with the master module 10, e.g., to extract data from or place data into the master module 10. The interface module 28 has an interconnect board 71 which connects the connector 30 to the interconnector 66 and which generally maintains the interconnector 66 in alignment for mating with the interconnector 38 of the master module 10.

Each of the individual modules which comprise the modular system 11 may derive power from internal battery packs and/or a remote power source. The battery packs might be rechargeable.

The modular system 11 thus comprises a plurality of modules and provides a variety of inventory control functions such as product tracking, merchandise ordering, label/tag printing, product pricing, and price verification.

Figure 3:
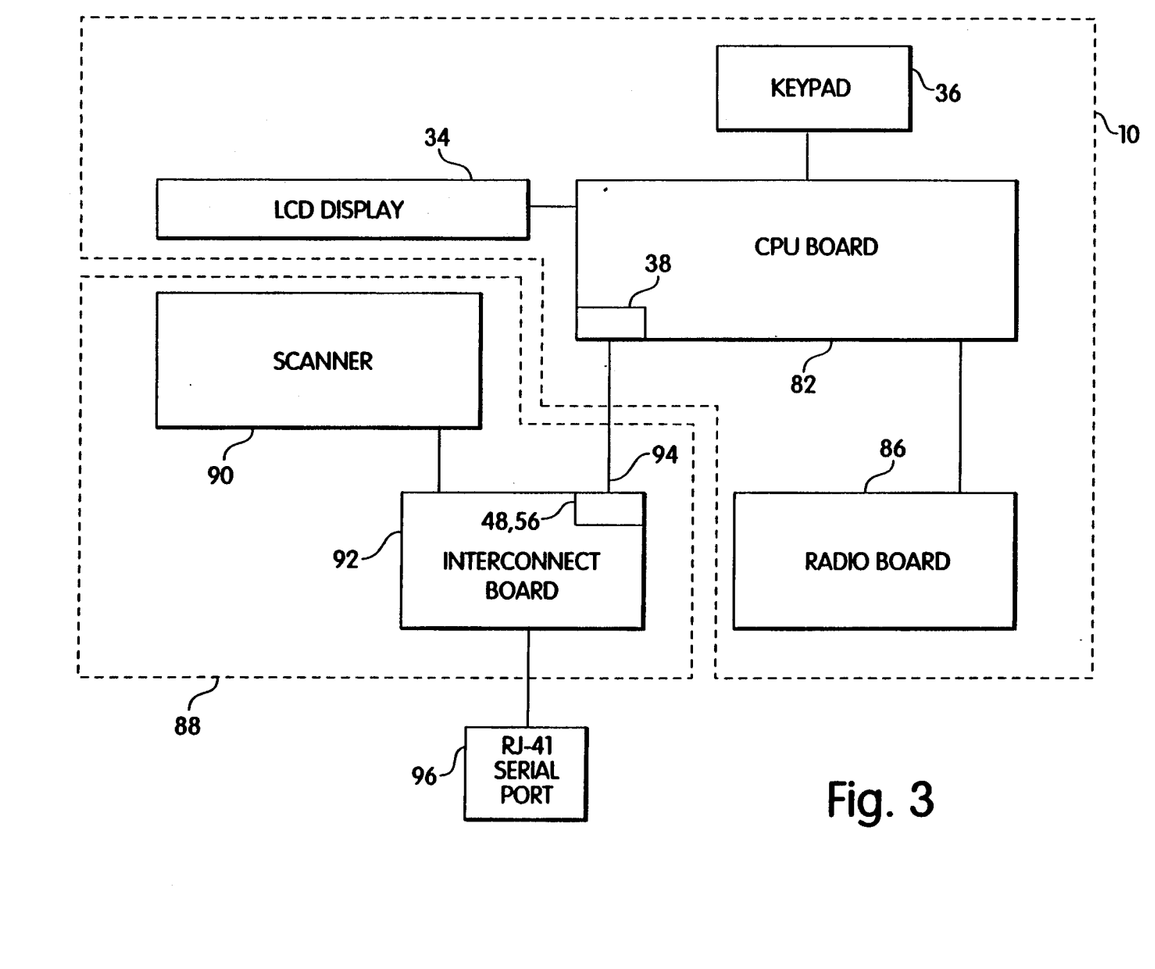
FIG. 3 is a block diagram of the master module interconnected to a scanning module.

Referring to FIG. 3, the programmable master module 10, which can be considered the "brain" of the modular system 11, generally includes a programmable central processing unit (CPU) board 82, the display 34 (which may be a liquid crystal display (LCD) having programmable contrast, alphanumeric and graphic display capabilities, and/or touch-screen capabilities), the keypad 36 (which might include a bezel-less elastomer membrane), and a RF board 86 for wireless RF communication. The CPU board 82 (which is equivalent to the programmable processing electronics 35 mentioned previously) is connected to and generally controls the display 34, the keypad 36, and the RF board 86 (which is equivalent to the RF electronics 39 mentioned previously). The master module 10 is interconnected to a scanning module 88 via the programmable CPU board 82. The scanning module 88 may be the laser scanning module 12, the CCD scanning module 14, or any other type of scanning device known to one of ordinary skill in the art. The scanning module 88 generally includes a scanner 90 (e.g., the laser scanner 43 or the CCD scanner 54) and an interconnect board 92.

The RF board 86 typically uses digital, spread-spectrum radio technology, and may be capable of communicating in real-time in a proprietary cellular network as well as with one or more databases maintained on the cellular network. Other communication schemes are known to those of ordinary skill in the art and can be used instead of spread-spectrum technology.

The scanner 90 can be an undecoded, microprocessor-controllable laser scanner which can have programmable features such as scan angle, marker beam, automatic object-sense, and long range. Alternatively, the scanner 90 might be a microprocessor-controllable, low-power, contact CCD scanner, or other image-capture device.

Referring again to FIG. 3, the interconnect board 92 has a port 94 for communicating with the master module 10 (e.g., via interconnectors 48 or 56 and interconnector 38) and may have a RJ-41 serial port 96 for interfacing with RJ-41 compatible devices such as undecoded or decoded scanners (such as the laser scanning module 12 and the CCD scanning module 14), a printer (such as the printer module 18), or any RS232-compatible device. The interconnect board 92 may include a microcontroller or microprocessor for performing decode algorithms (i.e., for interpreting barcodes).

Figure 4:
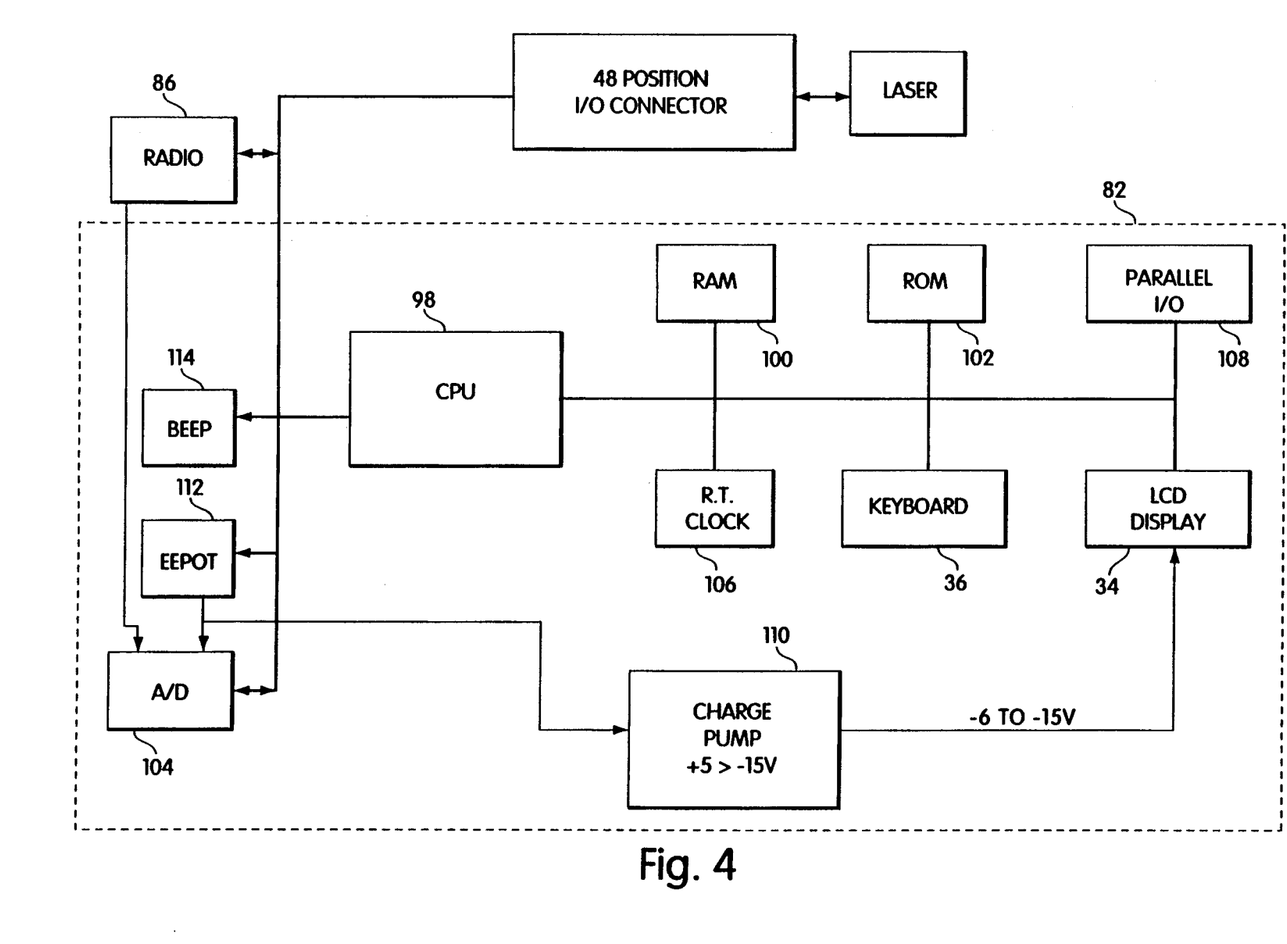
FIG. 4 is a block diagram of a central processing unit board in the master module.

The CPU board 82 is shown in greater detail in FIG. 4. In the disclosed embodiment, the CPU board 82 includes a CPU 98 (which may be one of the 68000-family microcontrollers available from Motorola), a random access memory (RAM) 100, a read only memory (ROM) 102, an analog-to-digital (A/D) converter 104, a clock 106, a parallel I/O port 108, a charge pump 110, a programmable contrast-controlling potentiometer (EEPOT) 112, and an audible beeper (BEEP) 114. The CPU 98 controls the entry of data via the keypad 36 and the displaying of data on the display 34, as well as the contrast of the display 34.

In the disclosed embodiment, the CPU 98 generally controls all functions of the master module 10. The RAM 100 typically contains several megabytes of storage and includes a battery for protecting stored information in the event of a power failure. The RAM 100 can store program instructions and data. The ROM 102 may store a factory-programmed operating system and configuration information for the modular system 11. The clock 106 maintains accurate time and date and typically includes a battery to protect against power failures. The keypad 36 can have logic to decode keystrokes. The parallel I/O port 108 is a bi-directional interface which can be used for system expansion, to interface with printers, or to interface with any parallel I/O device. The display 34 can include a data bus interface. The A/D converter 104 can monitor RF signal strength from the RF board 86 on one channel and the position of the EEPOT 112 on another channel. The EEPOT 112, which is controlled via the keypad 36, controls the output of the charge pump 110 which in turn controls the contrast of the display 34. The BEEP 114 provides an audible indicator under control of the CPU 98.

The interconnector 38 on the master module 10 preferably is a 48-pin connector. The interconnectors 48, 56, 60, 66, and 68 (i.e., the interconnectors which mate with the master module 10) each preferably are a 48-pin connector which mates with the 48-pin interconnector 38 of the master module 10. The interconnector 38 may be a 48-pin male connector and the interconnectors 48, 56, 60, 66, and 68 each may be a 48-pin receiving female connector. Such connectors generally are known to those of ordinary skill in the art. Other connector configurations are possible and are known to those of ordinary skill in the art, Other modifications and implementations will occur to those skilled in the art without departing from the spirit and the scope of the invention as claimed. Accordingly, the invention is to be defined not by the preceding illustrative description, but by the following claims.

What is claimed is:

1. A modular and portable system for inventory control, comprising:
 a hand-holdable scanning module comprising:
  (i) a head portion including:
   a scanner for projecting light at an object, detecting light reflected from the object, and generating an electrical signal representative of the object,
   programmable decode electronics coupled to said scanner for receiving the electrical signal and decoding it to interpret the object, and a first interconnector coupled to said programmable decode electronics; and a handle portion formed integrally with said head portion and including:

activating means for causing said scanner to generate the electrical signal, and a battery for supplying power to said scanner and said programmable decode electronics in said head portion; and (b) a programmable master module releasably coupled to said scanning module to form a potable scanner device capable of reading and analyzing objects and storing information related thereto, said master module comprising:

(i) a display,
(ii) a keypad,
(iii) memory,
(iv) programmable processing electronics coupled to the display, keypad, and memory, and
(v) a second interconnector, coupled to the processing electronics, for interconnecting with said first interconnector of said scanning module to form said portable scanner device, wherein said master module also is releasably couplable with any one of a plurality of non-scanning modules when released from said scanning module.

2. The system of claim 1 wherein said plurality of non-scanning modules include a printer module, an interface module, and a suitcase module.

3. The system of claim 1 wherein said programmable master module further includes a radio-frequency antenna and radio-frequency communication electronics.

4. The system of claim 3 wherein said radio-frequency communication electronics perform real-time communication with a database maintained on a cellular network.

5. The system of claim 1 wherein said scanner in the head portion of said scanning module comprises a laser scanner.

6. The system of claim 1 wherein said scanner in the head portion of said scanning module comprises a charge-coupled device scanner.

7. A method of performing inventor control functions, comprising:

providing a modular and portable system comprising:

(A) a light-weight, hand-holdable scanning module comprising:

(i) a head portion including:

a scanner for projecting light at a bar code symbol, detecting light reflected from the symbol, and generating an electrical signal representative of the symbol, programmable decode electronics coupled to said scanner for receiving the electrical signal and decoding it to interpret the symbol, and a first interconnector coupled to said programmable decode electronics; and (ii) a handle portion formed integrally with said head portion and including:

activating means for causing said scanner to generate the electrical signal, and a battery for supplying power to said scanner and said programmable decode electronics in said head portion; and (B) a light-weight, programmable master module releasably coupled to said scanning module to form a portable and programmable scanner device, said master module comprising:

(i) a display,
(ii) a keypad,
(iii) memory,
(iv) programmable processing electronics coupled to the display, keypad, and memory, and
(v) a second interconnector, coupled to the processing electronics, for interconnecting with said first interconnector of said scanning module to form said portable and programmable scanner device, wherein said master module also is releasably couplable with any one of a plurality of non-scanning modules when released from said scanning module;

decoupling said scanning module from said master module and using said scanning module to read and decode bar code symbols; and coupling said scanning module to said master module to form said portable and programmable scanner device and using said device to read and analyze bar code symbols and to store information related thereto.

* * * * *